United States Patent
Ryne et al.

(10) Patent No.: US 11,130,494 B2
(45) Date of Patent: Sep. 28, 2021

(54) TRANSITION GOVERNANCE SYSTEM AND METHOD FOR AUTONOMOUS VEHICLE

(71) Applicant: STEERING SOLUTIONS IP HOLDING CORPORATION, Saginaw, MI (US)

(72) Inventors: Patrik M. Ryne, Midland, MI (US); Michael R. Story, Bay City, MI (US); Michelle Greb, Macomb, MI (US); Joachim J. Klesing, Rochester, MI (US); Pierre C. Longuemare, Paris (FR); Ayyoub Rezaeian, Troy, MI (US); Harold Li, Shelby Township, MI (US); Robert E. Llaneras, Pulaski, VA (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 500 days.

(21) Appl. No.: 15/797,662

(22) Filed: Oct. 30, 2017

(65) Prior Publication Data
US 2019/0126925 A1    May 2, 2019

(51) Int. Cl.
*B60W 30/182* (2020.01)
*B60W 10/18* (2012.01)
(Continued)

(52) U.S. Cl.
CPC .......... *B60W 30/182* (2013.01); *B60W 10/18* (2013.01); *B60W 10/20* (2013.01);
(Continued)

(58) Field of Classification Search
CPC ...... B60W 10/00; B60W 10/18; B60W 10/20; B60W 2050/0062; B60W 2050/0075;
(Continued)

(56) References Cited

U.S. PATENT DOCUMENTS

2015/0314780 A1* 11/2015 Stenneth .............. G05D 1/0061
                                                            701/23
2016/0207537 A1*  7/2016 Urano ................. B60W 30/182

FOREIGN PATENT DOCUMENTS

| CN | 1616271 A   | 5/2005  |
| CN | 105584522 A | 5/2016  |
| CN | 106065942 A | 11/2016 |

OTHER PUBLICATIONS

Chinese Office Action and Search Report from the Chinese Patent Office for corresponding Chinese Patent Application No. 201811279612.3 dated Jun. 24, 2021, 17 pages.

* cited by examiner

*Primary Examiner* — Charles J Han
(74) *Attorney, Agent, or Firm* — Dickinson Wright PLLC

(57) ABSTRACT

A method of transitioning from an autonomous driving mode to a manual driving mode for a vehicle is provided. The method includes comparing a steering device input angle to an autonomously controlled steering angle to determine a steering angle error. The method also includes comparing an acceleration or deceleration input to an autonomously controlled acceleration or deceleration input to determine an acceleration or deceleration error. The method further includes progressively transitioning to the manual driving mode in a weighted manner based on a confidence level factor determined by a calculation that factors in the steering angle error and the acceleration or deceleration error.

20 Claims, 3 Drawing Sheets

(51) Int. Cl.
*B60W 10/20* (2006.01)
*B60W 50/14* (2020.01)
*G05D 1/00* (2006.01)

(52) U.S. Cl.
CPC ........... *B60W 50/14* (2013.01); *G05D 1/0088* (2013.01); *B60W 2050/146* (2013.01); *B60W 2540/10* (2013.01); *B60W 2540/12* (2013.01); *B60W 2540/18* (2013.01); *B60W 2720/106* (2013.01); *B60W 2720/24* (2013.01)

(58) Field of Classification Search
CPC . B60W 2050/0095; B60W 2050/0096; B60W 2050/146; B60W 2050/007; B60W 2540/00; B60W 2540/10; B60W 2540/12; B60W 2540/18; B60W 2720/00; B60W 2720/10; B60W 2720/106; B60W 2720/24; B60W 30/00; B60W 30/18; B60W 30/182; B60W 50/00; B60W 50/08; B60W 50/12; B60W 50/14; F16D 2500/50203; G05D 1/00; G05D 1/0061; G05D 1/0088
See application file for complete search history.

TRANSITION GOVERNANCE SYSTEM AND METHOD FOR AUTONOMOUS VEHICLE

BACKGROUND OF THE INVENTION

The invention relates to autonomous or semi-autonomous vehicles and, more particularly, to a transition governance system and method for such vehicles.

For autonomous or semi-autonomous vehicles, efficiently and safely transitioning from an autonomous driving mode to a manual driving mode must be managed. Smoothly transitioning has attempted to be accomplished in a number of ways and improvements are continuously being studied in the emerging field of autonomous vehicles.

SUMMARY OF THE INVENTION

According to one aspect of the disclosure, a method of transitioning from an autonomous driving mode to a manual driving mode for a vehicle is provided. The method includes comparing a steering device input angle to an autonomously controlled steering angle to determine a steering angle error. The method also includes comparing an acceleration or deceleration input to an autonomously controlled acceleration or deceleration input to determine an acceleration or deceleration error. The method further includes progressively transitioning to the manual driving mode in a weighted manner based on a confidence level factor determined by a calculation that factors in the steering angle error and the acceleration or deceleration error.

According to another aspect of the disclosure, a transition governance system for an autonomous or semi-autonomous vehicle includes a steering input device for inputting manual steering commands by an operator. Also included is a braking device. Further included is an accelerator. Yet further included is an advanced driving assist system (ADAS) in operative communication with the steering input device, the braking device, the accelerator, the ADAS controlling autonomous or semi-autonomous driving, a transition from an autonomous driving mode to a manual driving mode governed by the ADAS, the transition based on a confidence level determined by a calculation that factors in a steering angle error and an acceleration or deceleration error, the steering angle error defined as a difference between an angle of the steering input device and a target angle, the accelerator error defined as a difference between an acceleration or deceleration input and a target acceleration or deceleration.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated are examples of a system and method associated with transitioning between an autonomous mode and a manual mode of driving. The embodiments described herein assure that driving tasks shared between the driver and an autonomous driving system, such as an advanced driving assist system (ADAS), in a transition period will conclude to a smooth and continuous transition. In addition, the embodiments will guide the driver (also referred to herein as an operator) during transition to make sure the driver's commands will be safe and within an acceptable range. Therefore, the system gives the driver a feeling of comfort and confidence during the transition.

The embodiments described herein are applicable to autonomous or semi-autonomous vehicles. Autonomous or semi-autonomous vehicles include at least one aspect of driving functionality that is performed automatically with no, or minimal, driver input. Steering, braking and accelerating are examples of driving capabilities that may be carried out autonomously or semi-autonomously when the vehicle is in an autonomous driving mode. When such aspects of driving are commanded by the driver, the vehicle is said to be in a manual driving mode. The autonomous driving mode requires one or more systems in operative communication with vehicle components, such as components associated with steering, braking and accelerating. One such system is referred to as an ADAS, as noted above. The ADAS includes various components, such as a controller and processor in operative communication with the vehicle components or devices.

Figure 1:
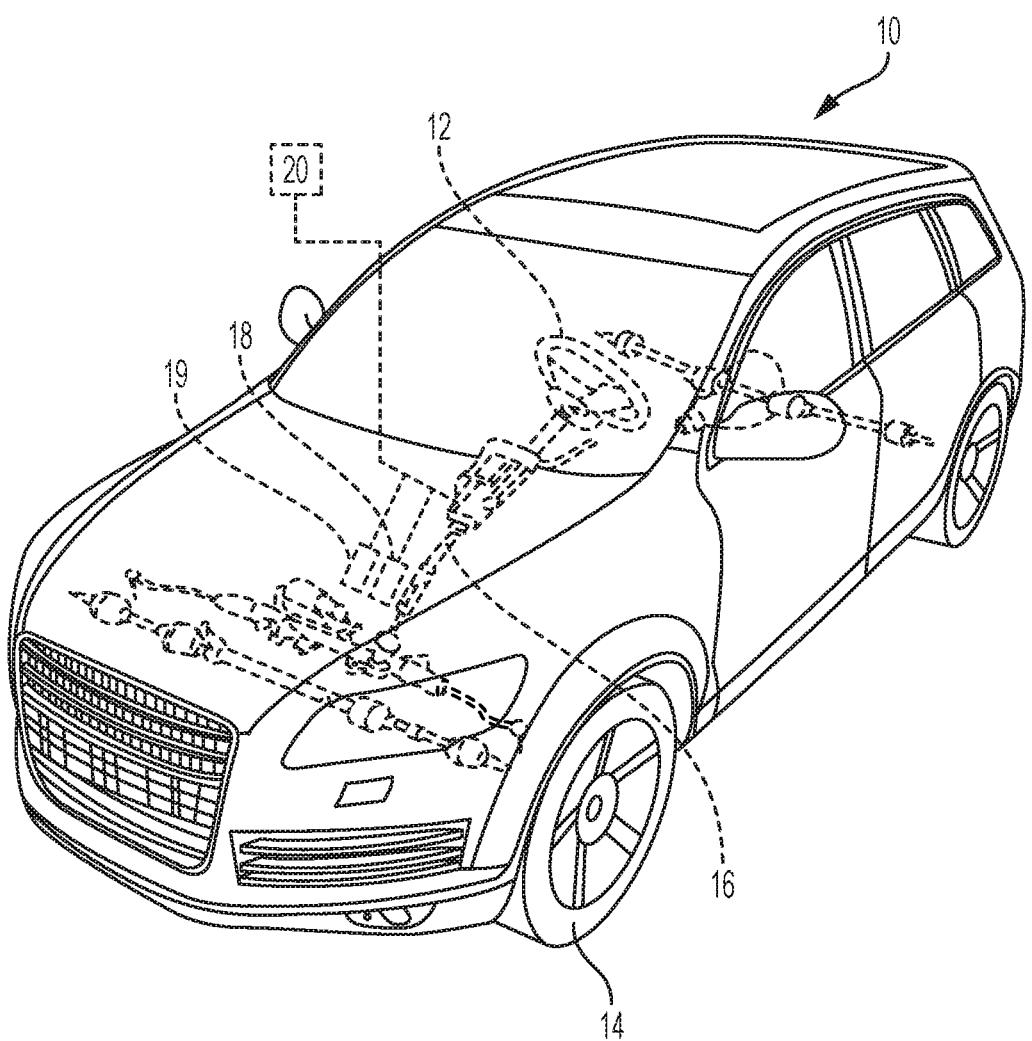
FIG. 1 is a perspective view of a vehicle with autonomous or semi-autonomous steering capabilities.

Referring to FIG. 1, an example of an autonomous vehicle is illustrated and generally referenced with numeral 10. The autonomous vehicle 10 includes a steering input device 12, such as a hand wheel, that allows a driver to provide steering commands to road wheels 14 of the vehicle 10. This is done via a steering column 16 and associated components operatively coupled to the road wheels 14. The vehicle 10 also includes a braking device 18 (e.g., brake pedal) and an accelerator 19 (e.g., accelerator pedal) for decelerating and accelerating the vehicle 10. As shown, an ADAS 20 is in operative communication with the steering column 16, the braking device 18 and the accelerator 19.

A driver may initiate transition from the manual driving mode to the autonomous driving mode, and vice versa, in any suitable manner. This may involve interaction with a button, switch, knob, lever, or the like, or movement of the steering input device 12 in a predetermined manner. Alternatively, a voice command is contemplated. Regardless of the precise manner in which initiation of transition is performed, the embodiments described herein manage the transition to the manual driving mode from the autonomous driving mode to ensure that the driver is inputting commands that substantially correspond to the commands being provided by the ADAS 20. The commands are associated with steering, accelerating or decelerating, for example. The preceding list of commands is merely exemplary and not intended to be limiting.

Figure 2:
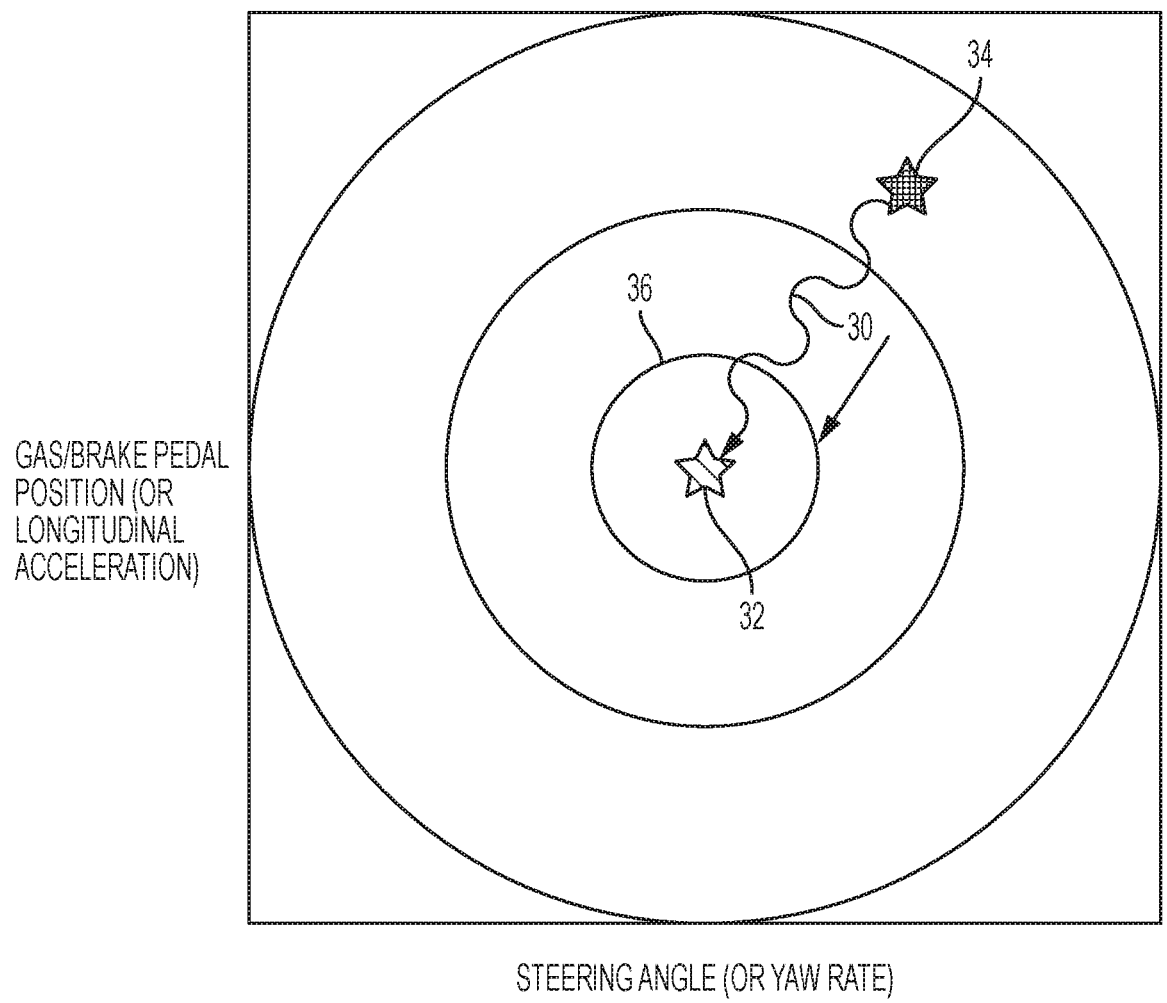
FIG. 2 is a 2-dimensional visual representation of a transition path associated with two driving factors during a transition from an autonomous driving mode to manual driving mode.

Referring now to FIG. 2, illustrated is a transition path 30 associated with driver input commands, relative to a transition target 32. The transition path 30 is defined by a transition start point 34 and the transition target 32, but the precise path is determined by multiple input commands from the driver, when compared to the transition target 32. The transition target 32 is a combination of one or more commands provided by the ADAS during the autonomous driving mode and at the outset of the transition period. For example, in the illustrated embodiment, the transition target 32 is a combination of a steering angle of the steering input device 12 and an acceleration or deceleration position of the braking device 18 and/or accelerator 19. In particular, the target steering angle is an autonomously controlled steering angle and the target acceleration or deceleration is an autonomously controlled acceleration or deceleration. Although illustrated as a data point associated with steering angle and acceleration or deceleration, it is to be appreciated that FIG. 2 represents a 2-dimensional control space that demonstrates the transition progress from the initial state of transition initiation (i.e., transition start point 34) to the final state that completes the transition (i.e., transition target 32). This 2-dimensional control space may be utilized to plot alternative commands associated with vehicle driving. The distance between the transition start point 34 and the transition target 32 may be referred to as an overall error between the driver input commands and the ADAS commands.

The 2-dimensional plot shown in FIG. 2 may be visually displayed to the driver in some embodiments. Visually displaying the interface to the driver assists in visualization of the comparison between his/her inputs and the autonomous driving system inputs (or optimal inputs to be achieved). Such an interface guides the driver to apply inputs that are closer to the transition target 32 that will safely and transition the vehicle to the manual driving mode, as the transition target 32 is within an acceptable, predetermined range represented with numeral 36. The transition is completed once the driver manipulates the input commands to be within the acceptable, predetermined range 36. The breadth of the acceptable, predetermined range 36 will vary depending upon the particular application of use and/or the particular driving circumstances.

In the illustrated example, the horizontal axis of the plot represents the steering angle of the steering input device 12. The vertical axis of the plot represents the acceleration or deceleration applied by the braking device 18 and/or the accelerator 19. Therefore, the horizontal distance between the transition target 32 and the transition start 34 represents a steering angle error, i.e., difference between angle of steering input device 12 and a target angle. Similarly, the vertical distance between the transition target 32 and the transition start 34 represents an acceleration or deceleration error, i.e., difference between acceleration or deceleration input and a target acceleration or deceleration. The overall distance represents the overall error, as noted above. Rather than forcing the driver to randomly manipulate the steering input device 12 and the brake device 18 and/or accelerator 19 to acceptable positions, the 2-D interface provides a reference and visually guides the driver to input commands that approach the transition target 32.

Figure 3:
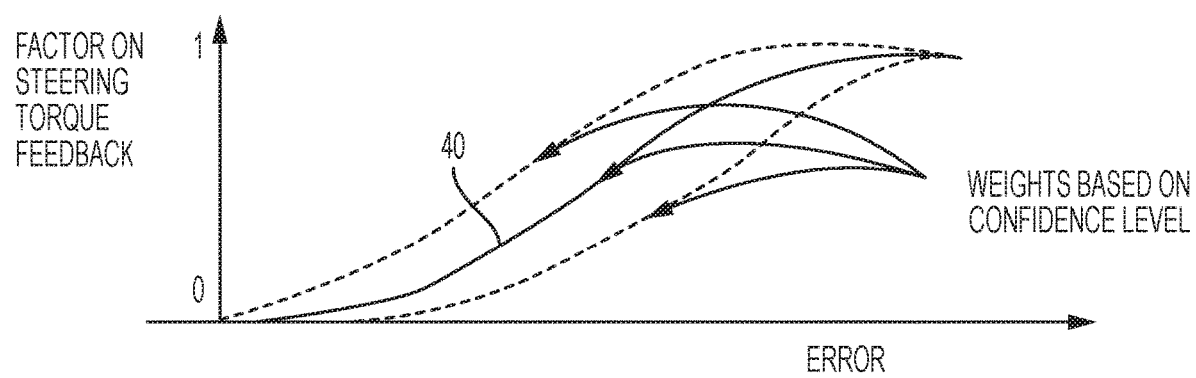
FIG. 3 is a plot of a steering torque feedback factor as a function of error between driver input(s) and target input(s)

Referring now to FIG. 3, a plot of a factor of steering torque feedback against a steering angle error is shown and generally referenced with numeral 40. Steering torque feedback is provided to the steering input device 12 to assist in guiding the driver to the desired steering angle in some embodiments. The magnitude of the torque feedback is dictated, at least in part, by the steering angle error. As shown, the torque feedback increases as the steering angle error increases, thereby making the driver aware of whether the steering angle is moving away from, or towards, the desired steering angle for transition completion. In the illustrated embodiment, the torque feedback does not increase linearly as a function of the steering angle error, but it is to be appreciated that a linear increase is contemplated.

In some embodiments, the factor of steering torque feedback is also a function of a confidence level that the ADAS has in the driver. The confidence level is determined by one or more factors, including but not limited to the overall error described above, which takes into account the steering angle error and the acceleration or deceleration error. The confidence level may also be determined by other factors, such as an ability to follow command prompts and/or biometric monitoring, for example. These are merely illustrative examples and not intended to be limiting of the factors that determine the confidence level in the driver. The ADAS applies weights to the vehicle control provided by the driver and the ADAS throughout the transition period. These weights are adaptive according to the confidence level, as shown by the three different plots illustrated in FIG. 3.

Although described above and illustrated in the context of steering torque being applied via a steering actuator, it is to be appreciated that feedback may be provided to the braking device 18 and/or the accelerator 19 in some embodiments with respective actuators (e.g., braking actuator and accelerator actuator). For example, an opposite force can be applied to the accelerator 19 to guide the driver to the desired pedal position.

Figure 4:
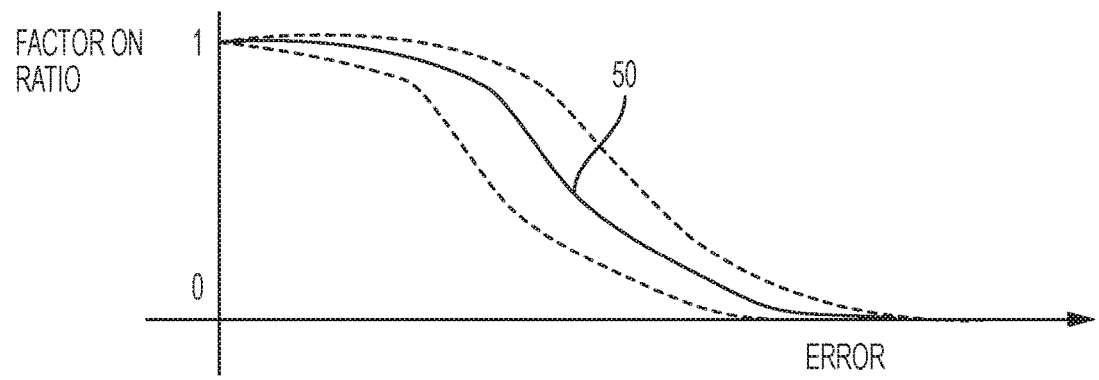
FIG. 4 is a plot of a steering ratio factor as a function of error between driver input(s) and target input(s).

FIG. 4 illustrates a steering ratio as a function of the steering error (as defined above) and generally referenced with numeral 50. The steering ratio is a ratio of driver control to ADAS control. A ratio of 1.0 corresponds to complete driver control and a ratio approaching 0.0 corresponds to nearly complete control by the ADAS. Although described above and illustrated in the context of a steering ratio, it is to be appreciated that the ratio of blended control may be provided to the braking device 18 and/or the accelerator 19 in some embodiments. As with the feedback applied to the steering input device 12, the braking device 18 and/or the accelerator 19 in FIG. 3, the steering ratio is weighted in a manner that is determined, at least in part, by the confidence level.

The embodiments described herein provide physical and visual feedback(s) to guide the driver to apply inputs that are closer to the desired inputs and facilitate a continuous, smooth and safe transition that instills confidence in the driver during the transition.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method comprising:
    determining a steering angle error based on a comparison between a steering device input angle and an autonomously controlled steering angle, the autonomously controlled steering angle being a target steering angle generated during autonomous control of a vehicle;

determining an acceleration or deceleration error based on a comparison between an acceleration or deceleration input and an autonomously controlled acceleration or deceleration input, the autonomously controlled acceleration or deceleration input being a target acceleration or deceleration input generated during autonomous control of the vehicle;

generating a confidence level value based on the steering angle error, the acceleration or deceleration error, and at least one biometric characteristic of an operator of the vehicle and an ability of the operator to follow a command prompt;

generating at least one of a manual driving weight and an autonomous driving weight based on the confidence level value;

selectively adjusting a vehicle steering control ratio based on the at least one of the manual driving weight and the autonomous driving weight, wherein the manual driving weight includes a multiplier applied to a portion of the vehicle steering control ratio corresponding to manual control of the vehicle steering and the autonomous driving weight includes a multiplier applied to a portion of the vehicle steering control ratio corresponding to autonomous control of the vehicle steering;

in response to a determination that the at least one of the manual driving weight and the autonomous driving weight has changed, further adjusting the vehicle steering control ratio; and generating a steering torque feedback based on at least the confidence level and the steering angle error.

2. The method of claim 1, further comprising indicating the steering torque feedback to the operator.

3. The method of claim 2, wherein a magnitude of the steering torque feedback is based on the steering angle error.

4. The method of claim 1, further comprising indicating an acceleration or deceleration indication to the operator based on the acceleration or deceleration error.

5. The method of claim 1, wherein the vehicle steering control ratio corresponds to a ratio of operator control to autonomous control of the vehicle.

6. The method of claim 5, further comprising indicating, to the operator, a visual indication including at least an operator command and an autonomous command.

7. The method of claim 6, wherein the visual indication includes a 2-dimensional plot representing the steering angle error and the acceleration or deceleration error.

8. A system for controlling a vehicle, the system comprising:
a controller configured to:
determine a steering angle error based on a difference between an angle of a steering input device and a target angle, the target angle being generated during autonomous control of a vehicle;
determine an accelerator error based on a difference between an acceleration or deceleration input and a target acceleration or deceleration, the target acceleration or deceleration being generated during autonomous control of the vehicle;
generate a confidence level value based on the steering angle error, the acceleration or deceleration error, and at least one biometric characteristic of an operator of the vehicle and an ability of the operator to follow a command prompt;
generate at least one of a manual driving weight and an autonomous driving weight based on the confidence level value;
selectively adjust a vehicle steering control ratio based on the at least one of the manual driving weight and the autonomous driving weight, wherein the manual driving weight includes a multiplier applied to a portion of the vehicle steering control ratio corresponding to manual control of the vehicle steering and the autonomous driving weight includes a multiplier applied to a portion of the vehicle steering control ratio corresponding to autonomous control of the vehicle steering;
in response to a determination that at least one of the manual driving weight and the autonomous driving weight has changed, further adjust the vehicle steering control ratio; and
generate a steering torque feedback based on at least the confidence level and the steering angle error.

9. The system of claim 8, wherein the target angle is intended to be used during autonomous control of the vehicle and the target acceleration or deceleration is intended to be used during autonomous control of the vehicle.

10. The system of claim 8, wherein the controller is further configured to indicated, to the operator, a visual indication including at least an operator command and an autonomous command.

11. The system of claim 10, wherein the visual indication includes a 2-dimensional plot representing the steering angle error and the acceleration or deceleration error.

12. The system of claim 8, wherein the vehicle steering control ratio corresponds to a ratio of operator control to autonomous control of the vehicle.

13. The system of claim 8, wherein the controller is further configured to autonomously or semi-autonomously control the vehicle.

14. The system of claim 8, wherein the controller, using a steering actuator, is further configured to apply the steering torque feedback to a steering input device of the vehicle.

15. The system of claim 14, wherein a magnitude of the steering torque feedback is based on the steering angle error.

16. A system comprising;
a controller that:
determines a steering angle error based on a difference between an angle of a steering input device and an angle generated by an autonomous driving system;
generates a confidence level value based on the steering angle error, an acceleration or deceleration error, and at least one biometric characteristic of an operator of the vehicle and; an ability of the operator to follow a command prompt;
generates at least one of a manual control weight and an autonomous control weight based on the confidence level value;
selectively adjusts a steering control ratio based on the at least one of the manual control weight and the autonomous control weight, wherein the manual control weight includes a multiplier applied to a portion of the vehicle steering control ratio corresponding to manual control of the vehicle steering and the autonomous control weight includes a multiplier applied to a portion of the vehicle steering control ratio corresponding to autonomous control of the vehicle steering;

in response to a determination that the steering angle error has changed, further adjusts the steering control ratio; and generates a steering torque feedback based on at least the confidence level and the steering angle error.

17. The system of claim 16, wherein the controller indicates an indication of the angle of a steering input device and the angle of the autonomous driving system.

18. The system of claim 17, wherein the indication includes a 2-dimensional plot.

19. The system of claim 16, wherein the steering control ratio corresponds to a ratio of operator control to autonomous control of the vehicle.

20. The system of claim 19, wherein the controller increases the first value in response to a decrease in the steering angle error.

* * * * *